US012626730B2

(12) United States Patent　　　　(10) Patent No.:　　US 12,626,730 B2

Kanzaki　　　　　　　　　　　　　　(45) Date of Patent:　　　May 12, 2026

(54) INFORMATION PROCESSING APPARATUS CONTROLLING IMAGE CAPTURING AND RECORDING IN MOBILE IMAGE CAPTURING APPARATUS, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Akane Kanzaki, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/944,154

(22) Filed: Nov. 12, 2024

(65) Prior Publication Data

US 2025/0174252 A1　　May 29, 2025

(30) Foreign Application Priority Data

Nov. 28, 2023　(JP) ................................. 2023-200675

(51) Int. Cl.
*G11B 27/34*　　　(2006.01)
*G11B 27/031*　　(2006.01)
*H04N 5/91*　　　(2006.01)

(52) U.S. Cl.
CPC ............ *G11B 27/34* (2013.01); *G11B 27/031* (2013.01); *H04N 5/91* (2013.01)

(58) Field of Classification Search
CPC ......... H04N 5/91; G11B 27/34; G11B 27/031
See application file for complete search history.

(56) References Cited

U.S. PATENT DOCUMENTS

2003/0045983 A1*　3/2003　Kondo .................... B62D 1/28
　　　　　　　　　　　　　　　　　　701/41
2018/0218758 A1*　8/2018　Maeda ................. G11B 27/036

FOREIGN PATENT DOCUMENTS

JP　　　　2012216102 A　　11/2012
JP　　　　2022104716 A　　7/2022

* cited by examiner

*Primary Examiner* — Mishawn N. Hunter
(74) *Attorney, Agent, or Firm* — Cowan, Liebowitz & Latman, P.C.

(57)　　　　　　　ABSTRACT

An information processing apparatus that can accurately record information about a steering instruction of a mobile object in real time in association with captured data captured by a mobile image capturing apparatus. The information processing apparatus including a memory device that stores a set of instructions and at least one processor that executes the set of instructions to obtain steering instruction information about a mobile object with steering, generate steering-instruction related information corresponding to the steering instruction information, obtain captured data generated by an image capturing apparatus, which is mounted on a mobile image capturing apparatus, capturing an image of the mobile object; and record the captured data and the steering-instruction related information generated in association with each other whenever the captured data is obtained from the image capturing apparatus.

19 Claims, 9 Drawing Sheets

*FIG. 4B*

| STEERING INSTRUCTION INFORMATION | STEERING INSTRUCTION CONTENT |
|---|---|
| 1-10 | TREADING DEGREE OF ACCELERATOR 10% |
| 1-20 | TREADING DEGREE OF ACCELERATOR 20% |
| 1-30 | TREADING DEGREE OF ACCELERATOR 30% |
| ... | ... |

*FIG. 4A*

| STEERING INSTRUCTION INFORMATION | STEERING INSTRUCTION CONTENT |
|---|---|
| 1-1 | TREADING OF ACCELERATOR |
| 1-2 | TURNING OF STEERING WHEEL |
| 1-3 | OPENING OF WINDOW |
| ... | ... |

*FIG. 5*

| STEERING INSTRUCTION INFORMATION | STEERING INSTRUCTION CONTENT | STEERING-INSTRUCTION RELATED INFORMATION (EDIT POINT FLAG) | EDIT POINT |
|---|---|---|---|
| 1-1 | TREADING OF ACCELERATOR | 2-3 | IN-POINT FOR SOUND |
| 1-2 | OPENING OF WINDOW | 2-1 | IN-POINT FOR IMAGE |
| 1-3 | CLOSING OF WINDOW | 2-2 | OUT-POINT FOR IMAGE |
| ... | ... | ... | ... |

FIG. 6A

| STEERING INSTRUCTION INFORMATION | STEERING INSTRUCTION CONTENT | STEERING-INSTRUCTION RELATED INFORMATION (TRANSITION EDIT POINT FLAG) | TRANSITION EDIT POINT |
|---|---|---|---|
| 1-4 | TURNING OF STEERING WHEEL | 3-1 | IN-POINT FOR IMAGE TRANSITION |
| 1-1 | TREADING OF ACCELERATOR | 3-2 | IN-POINT FOR SOUND TRANSITION |
| ... | ... | ... | ... |

FIG. 6B

| STEERING INSTRUCTION INFORMATION | STEERING INSTRUCTION CONTENT | STEERING-INSTRUCTION RELATED INFORMATION (RECOMMENDED TRANSITION FLAG) | RECOMMENDED TRANSITION |
|---|---|---|---|
| 1-4 | TURNING OF STEERING WHEEL | 4-1 | ROTATION TRANSITION |
| 1-2 | TREADING OF ACCELERATOR | 4-2 | BGM FADE IN |
| ... | ... | ... | ... |

*FIG. 7*

| STEERING INSTRUCTION INFORMATION | STEERING INSTRUCTION CONTENT | CAMERA WORK INFORMATION | CAMERA WORK | STEERING-INSTRUCTION RELATED INFORMATION (CAPTURED TRANSITION FLAG) |
|---|---|---|---|---|
| 1-4 | TURN STEERING WHEEL | 5-1 | IMAGE ROTATION | 6-1 |
| 1-1 | STEP ON ACCELERATOR | 5-2 | TILT | 6-2 |
| ... | ... | ... | ... | ... |

*FIG. 8*

| STEERING INSTRUCTION INFORMATION | STEERING INSTRUCTION CONTENT | STEERING-INSTRUCTION RELATED INFORMATION (WEIGHTING RESULT) |
|---|---|---|
| 1-10 | TREADING DEGREE OF ACCELERATOR 10% | 7-20 |
| 1-20 | TREADING DEGREE OF ACCELERATOR 20% | 7-40 |
| 1-30 | TREADING DEGREE OF ACCELERATOR 30% | 7-60 |
| . . . | . . . | . . . |

*FIG. 9*

| STEERING INSTRUCTION INFORMATION | STEERING INSTRUCTION CONTENT | SURROUNDING SPACE INFORMATION | SURROUNDING SPACE | STEERING-INSTRUCTION RELATED INFORMATION (EDIT POINT FLAG) |
|---|---|---|---|---|
| 1-1 | TRADING OF ACCELERATOR | 8-1 | BLINKER OF ANOTHER CAR | 9-1 |
| 1-3 | OPENING OF WINDOW | 8-2 | RAIN | 9-2 |
| ... | ... | ... | ... | ... |

INFORMATION PROCESSING APPARATUS CONTROLLING IMAGE CAPTURING AND RECORDING IN MOBILE IMAGE CAPTURING APPARATUS, CONTROL METHOD THEREFOR, AND STORAGE MEDIUM STORING CONTROL PROGRAM THEREFOR

BACKGROUND OF THE INVENTION

Field of the Invention

The present invention relates to an information processing apparatus, a control method therefor, and a storage medium storing a control program therefor that control image capturing and recording in a mobile image capturing apparatus.

Description of the Related Art

In recent years, attention has been given to a style of capturing an image during a drive and making it an image work as a drive VLOG. Since various image cuts are required in a VLOG, a user who makes a drive VLOG using a mobile image capturing apparatus such as a drone has started to appear.

In order to obtain a drive VLOG with higher quality, a user may want an edition to add sound to an image in accordance with an operation of a car and an edition to insert a transition between scenes of a captured image. For example, there are an edition to add an engine sound to a scene in which an accelerator is stepped on, an edition to rotate a steering wheel at an end of a scene and then to add a rotation transition between the scene and the next scene, etc.

Meanwhile, a technique to record image data captured by a drone and information related to the image data is disclosed. For example, Japanese Patent Laid-Open Publication No. 2022-104716 (JP 2022-104716A) discloses a technique to record image data captured by a camera of a drone and to generate identification information for identifying the recorded image data.

Japanese Patent Laid-Open Publication No. 2012-216102 (JP 2012-216102A) discloses the following technique. That is, an onboard image capturing apparatus captures an image by a built-in camera, obtains additional information characterizing the image captured, and transmits the additional information to an image management apparatus. The image management apparatus determines whether the image characterized by the additional information is necessary based on the additional information. When determining that the image is necessary, the image management apparatus requests and receives the image data from the image capturing apparatus and stores the image data in association with the additional information.

However, the identification information of JP 2022-104716A and the additional information of JP 2012-216102A are information about the image captured by the camera such as the image captured time and are not information about an object captured by the camera.

For example, when a mobile object is a car, information about a treading degree of an accelerator by a user who drives the car can be theoretically obtained by analyzing an acceleration of the car from the image data recorded in the camera, but is difficult to obtain the treading degree of the accelerator with high accuracy. In addition, when such analysis is performed, there is a problem that information about a steering instruction to the mobile object cannot be recorded in association with the captured image in real time.

In the VLOG production, a work is produced while combining various captured data including image data and sound data obtained with a drone through image capturing. Therefore, when only the image data that are determined to be necessary are recorded together with the additional information as in JP 2012-216102A, there is a problem that the captured data required by the user in editing may not be recorded.

SUMMARY OF THE INVENTION

The present invention provides an information processing apparatus, a control method therefor, and a storage medium storing a control program therefor, which can accurately record information about a steering instruction of a mobile object in real time in association with captured data captured by a mobile image capturing apparatus.

Accordingly, an aspect of the present invention provides an information processing apparatus including a memory device that stores a set of instructions and at least one processor that executes the set of instructions to obtain steering instruction information about a mobile object with steering, generate steering-instruction related information corresponding to the steering instruction information, obtain captured data generated by an image capturing apparatus, which is mounted on a mobile image capturing apparatus, capturing an image of the mobile object; and record the captured data and the steering-instruction related information generated in association with each other whenever the captured data is obtained from the image capturing apparatus.

According to the present invention, the information about the steering instruction of the object involving movement can be recorded in association with the captured data captured by the mobile image capturing apparatus with high accuracy in real time.

Further features of the present invention will become apparent from the following description of exemplary embodiments with reference to the attached drawings.

BRIEF DESCRIPTION OF THE DRAWINGS

FIG. 4A and FIG. 4B are views showing correspondence tables each of which describes relationship between a steering instruction content and steering instruction information.

FIG. 5 is a view showing a correspondence table describing relationship between the steering instruction information and information related to a steering instruction (hereinafter, referred to as "steering-instruction related information") in a case where the steering-instruction related information is an edit point flag.

FIG. 6A and FIG. 6B are views showing correspondence tables each of which describes relationship between the steering instruction information and steering-instruction related information in a case where the steering-instruction related information is a flag related to transition.

FIG. 7 is a view showing a correspondence table describing relationship between the steering instruction information and the steering-instruction related information in a case where the steering-instruction related information is an already-captured transition flag.

FIG. 8 is a view showing a correspondence table describing relationship between the steering instruction information and the steering-instruction related information in a case where the steering-instruction related information is a weighting result of the steering instruction information.

FIG. 9 is a view showing a correspondence table describing relationship between the steering instruction information and the steering-instruction related information in a case where the steering-instruction related information is an edit point flag related to a surrounding space.

DESCRIPTION OF THE EMBODIMENTS

Figure 1:
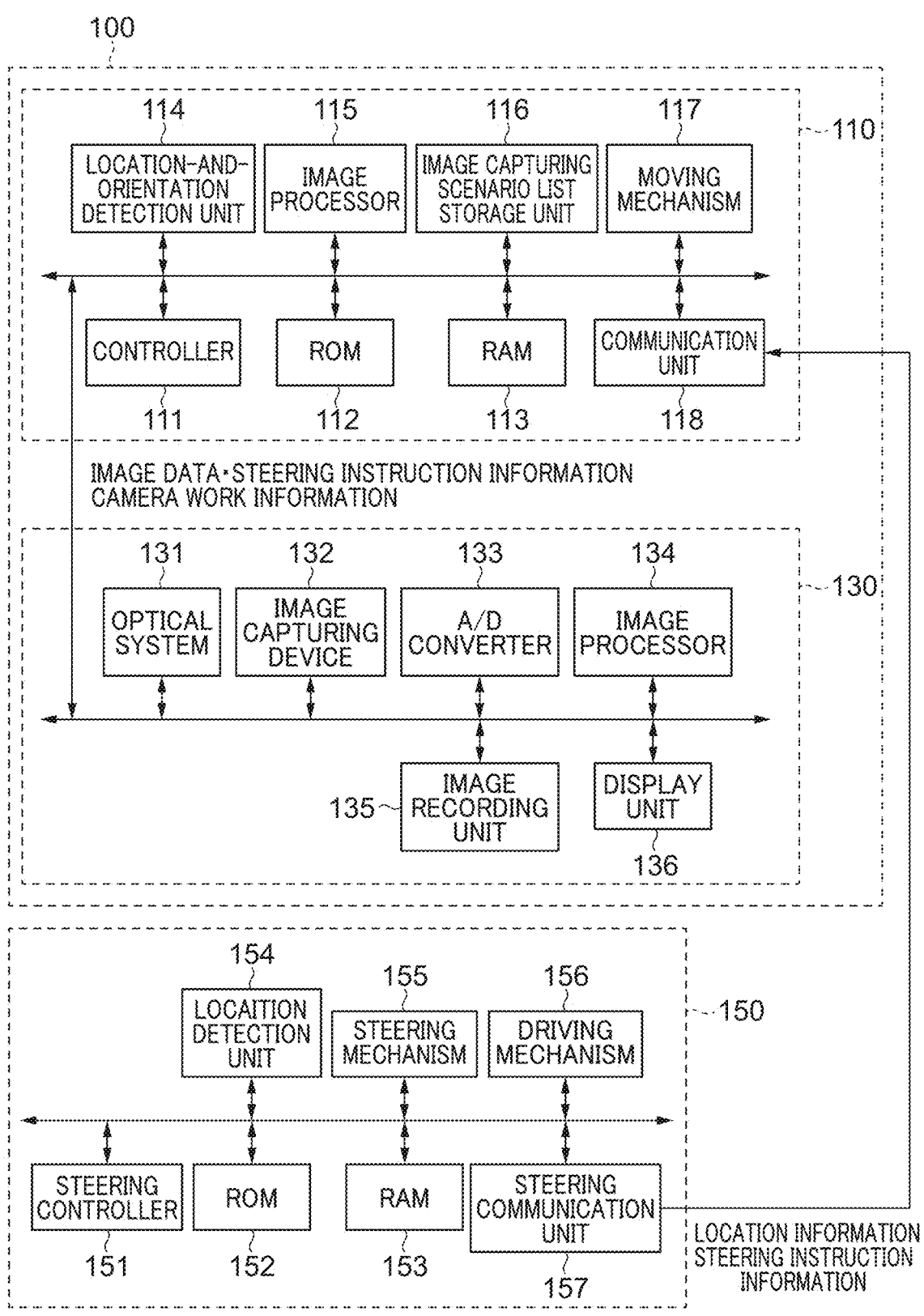
FIG. 1 is a block diagram showing hardware configuration examples of a mobile image capturing apparatus containing an image recording unit as an information processing apparatus according to an embodiment of the present invention and a mobile object that is an image capturing target of the mobile image capturing apparatus.

Hereafter, embodiments according to the present invention will be described in detail by referring to the drawings.

In this embodiment, a desired moving image is captured by changing a location, an orientation, and an image capturing condition of a mobile image capturing apparatus in accordance with steering instruction information of a mobile object with steering. In this embodiment, an example in which the mobile image capturing apparatus moves by flying in air by propellers will be described, but the moving method is not limited thereto. For example, the mobile image capturing apparatus may move on the ground by using wheels or may move in water by using a screw.

Hereinafter, the mobile image capturing apparatus 100 including an image recording unit 135 as the information processing apparatus according to the embodiment of the present invention and the mobile object 150 with steering that is an image capturing target of the mobile image capturing apparatus 100 and is communicably connected to the mobile image capturing apparatus 100 in a wireless communication will be described in detail with reference to the accompanying drawings.

FIG. 1 is a block diagram showing hardware configuration examples of the mobile image capturing apparatus 100 and the mobile object 150.

As shown in FIG. 1, the mobile image capturing apparatus 100 is configured by an image capturing apparatus 130 (an image capturing unit) and a moving apparatus 110 on which the image capturing apparatus 130 is mounted. The image capturing apparatus 130 and the moving apparatus 110 are mutually connected via a bus so as to communicate image data, steering instruction information, camera work information, etc. described later. The mobile object 150 is an object captured by the image capturing apparatus 130 and moves in response to a steering instruction.

First, the configuration example of the moving apparatus 110 included in the mobile image capturing apparatus 100 will be described with reference to FIG. 1.

The moving apparatus 110 includes a controller 111, a ROM 112, a RAM113, a location-and-orientation detection unit 114, an image processor 115, an image capturing scenario list storage unit 116, a moving mechanism 117, and a communication unit 118. These blocks are communicably connected to each other via a bus The controller 111 is a CPU, for example, reads control programs for the blocks in the moving apparatus 110 and blocks in the image capturing apparatus 130 described later from the ROM 112 and develops the control programs onto the RAM 113 and runs them. Thus, the controller 111 controls the operations of the respective blocks in the mobile image capturing apparatus 100. Also, the controller 111 receives steering instruction information and location information from the mobile object 150 via the communication unit 118. The steering instruction information and the location information will be described later.

The ROM 112 is an electrically erasable and recordable nonvolatile memory, and stores parameters etc. necessary for an operation of each block in addition to the operation program for each block included in the mobile image capturing apparatus 100.

The RAM 113 is a rewritable volatile memory and is used for development of a program executed by the controller 111 and for temporary storage of data generated by the operations of the blocks in the mobile image capturing apparatus 100.

the location-and-orientation detection unit 114 includes a plurality of sensors that detect various information necessary for the position and orientation control of the moving apparatus 110, and outputs the detected position and orientation information to the controller 111. Examples of the sensor include a GPS sensor for detecting a position, the gyrosensor for detecting the angular velocity, the acceleration sensor for detecting the speed change, a magnetic sensor for detecting a direction, an atmospheric pressure sensor for detecting an altitude, and an ultrasonic sensor for detecting a distance to a surrounding object such as the object. The controller 111 performs a calculation according to the information detected by the location-and-orientation detection unit 114 and controls the location and orientation of the moving apparatus 110.

The image processor 115 performs various image processes related to the location and orientation of the moving apparatus 110 by analyzing the image captured by the image capturing apparatus 130 and the information necessary for the location-and-orientation control detected by the location-and-orientation detection unit 114. For example, the image processor 115 performs the image process for recognizing the object (for example, the mobile object 150) included in the image captured by the image capturing apparatus 130, and the controller 111 controls the moving mechanism 117 to track the object using the recognition result. A known method is used to recognize and track the object, and a detailed description thereof will be omitted.

The image capturing scenario list storage unit 116 records an image capturing scenario list received from an external information processing apparatus (not shown) via the communication unit 118. An image capturing scenario list may be recorded in the image capturing scenario list storage unit 116 in advance at the time of the initial setting.

The moving mechanism 117 is configured by a lifting force generation mechanism including motors and propellers. The controller 111 controls the location and orientation of the moving apparatus 110 by driving the moving mechanism 117 in accordance with the information detected by the location-and-orientation detection unit 114 and the recognition result of the object by the image processor 115. This enables tracking image capturing to control the field angle so that the mobile object 150 will be included in a viewing field area captured by the image capturing apparatus 130.

The communication unit 118 communicates with the mobile object 150 based on a communication scheme defined by a standard, for example, a wireless LAN.

Next, the configuration example of the image capturing apparatus 130 included in the mobile image capturing apparatus 100 will be described with reference to FIG. 1.

The image capturing apparatus 130 includes an optical system 131, an image capturing device 132, an A/D converter 133, an image processor 134, an image recording unit 135, and a display unit 136. These blocks are communicably connected to each other via a bus.

The optical system 131 is configured by a diaphragm mechanism and lens groups including a zoom lens group and a focus lens group, and forms an object image on an image capturing surface of the image capturing device 132.

The image capturing device 132 is, for example, an image sensor such as a CCD sensor or a CMOS sensor, and photoelectrically converts an optical image formed on the image capturing surface of the image capturing device 132 by the optical system 131 and outputs an obtained analog image signal to the A/D converter 133.

The A/D converter 133 converts the input analog image signal into digital image data and outputs the digital image data. The digital image data output from the A/D converter 133 is temporarily stored in the RAM 113.

The image processor 134 applies various image processes to the digital image data stored in the RAM 113. Specifically, the image processor 134 applies the various image processes, such as a demosaicing process, a noise reduction process, a white balance correction process, and a gamma correction process, for developing, displaying, and recording the digital image data. The image processes include a process of generating moving image data from the digital image data stored in the RAM 113 in time series.

The image recording unit 135 records the data including the moving image data generated by the image processor 134 into a built-in recording medium. The image recording unit 135 obtains the steering instruction information received via the communication unit 118 and the camera work information indicating information about the camera work indicating the movement of the moving apparatus 110 during image capturing by the image capturing apparatus 130, such as rotation of the camera, and generates and records information about the steering instruction. The process of the image recording unit 135 will be described later.

the display unit 136 includes a display panel such as an LCD panel, and displays the digital image data stored in the RAM 113 and the video data recorded in the image recording unit 135 on the display panel.

Next, the configuration example of the mobile object 150 will be described with reference to FIG. 1. In this embodiment, the mobile image capturing apparatus 100 captures the mobile object 150 with the image capturing apparatus 130 and generates image data. Although the mobile object 150 is an automobile in this embodiment, the mobile object 150 is not limited thereto. For example, the mobile object 150 may be an object, such as a motorcycle, a ship, an airplane, or a train, that is controlled by an operator to move. The mobile object 150 may be a device that is not operated by an operator and is automatically steered while recognizing a surrounding situation. The mobile object 150 may be a device like a radio-controlled car that is not steered by an occupant but is controlled by remote control. The automatic operation and the remote operation are performed by known methods, and detailed descriptions thereof are omitted.

The mobile object 150 includes a steering controller 151, a ROM 152, a RAM 153, a location detection unit 154, a steering mechanism 155, a driving mechanism 156, and a steering communication unit 157. These blocks are communicably connected to each other via a bus The steering controller 151 is a CPU, for example, reads control programs for the respective blocks in the mobile object 150 from the ROM 152, develops the control programs onto the RAM 153, and executes them. Thus, the steering controller 151 controls operations of the respective blocks in the mobile object 150. The steering controller 151 also sends steering instruction information and location information to the moving apparatus 110 via the steering communication unit 157. The steering instruction information and the location information will be described later.

The ROM 152 is an electrically erasable and recordable nonvolatile memory and stores parameters necessary for operations of the respective blocks in addition to operation programs for the respective blocks in the mobile object 150.

The RAM 153 is a rewritable volatile memory and is used for development of a program executed by the steering controller 151 and for temporary storage of data generated by the operations of the blocks in the mobile object 150.

The location detection unit 154 includes a plurality of sensors for obtaining a three dimensional spatial location and outputs information about the three dimensional spatial location calculated from information detected by the respective sensors to the steering controller 151. The sensors may include a GPS sensor for detecting a two dimensional plane location and an atmospheric pressure sensor for detecting an altitude, for example. The location detection unit 154 calculates three dimensional location information of the mobile object 150 by using these sensors. A GPS sensor may be used as the sensor for detecting the altitude.

The steering mechanism 155 is a mechanism for the occupant to instruct the mobile object 150 to steer. Specifically, the steering mechanism 155 is configured by movable mechanisms, such as a steering wheel, an accelerator, a brake pedal, a blinker lever, a wiper lever, and a light switch. Whenever the occupant issues an instruction by operating the steering mechanism, the steering instruction information is output to the driving mechanism 156.

The driving mechanism 156 drives not-shown mechanisms (movable mechanisms such as front wheels, an engine, and headlamps, and notification mechanisms such as blinker lamps, brake lamps, and a horn) in the mobile object 150 in accordance with the steering instruction information output from the steering mechanism 155.

Specifically, when the steering angle of the steering wheel is output as the steering instruction information from the steering mechanism 155, the driving mechanism 156 transmits the steering instruction information to an actuator that controls a traveling direction of the mobile object 150, and changes the direction of the front wheels. When a treading degree of the accelerator is output as the steering instruction information from the steering mechanism 155, the driving mechanism 156 transmits the steering instruction information to the actuator for controlling the acceleration of the mobile object 150 to increase rpm of the engine.

In addition, a lamp switch operation, a blinker lever operation, a brake pedal treading, a horn operation, etc. may be output as the steering instruction information from the steering mechanism 155. In this case, the driving mechanism 156 notifies others by light by lighting the headlamps, the blinker lamps, or the brake lamps, or notifies others by sound by sounding the horn according the steering instruction information.

The steering communication unit 157 communicates with the communication unit 118 based on a communication scheme defined by a standard, for example, a wireless LAN.

Next, the software configuration of the image recording unit 135 in FIG. 1 will be described with reference to FIG. 2.

The image recording unit 135 in this embodiment is characterized in that the steering-instruction related information is generated from the steering instruction information obtained from the mobile object 150 via the communication unit 118 and the generated steering-instruction related information is recorded in association with the image data captured by the image capturing apparatus 130.

Figure 2:
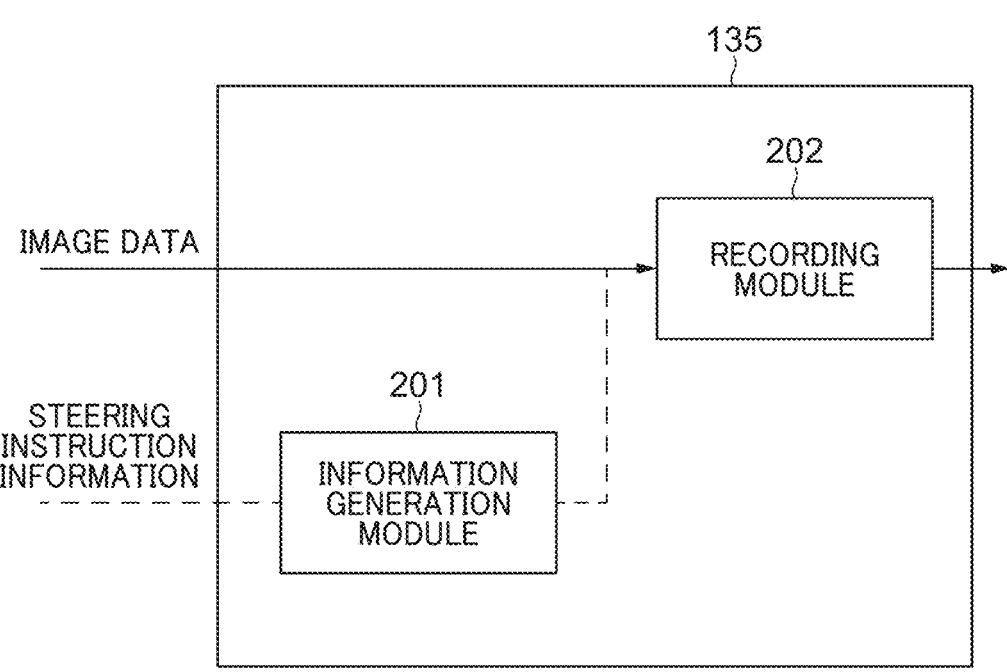
FIG. 2 is a block diagram showing a software configuration of the image recording unit.

The image recording unit 135 in this embodiment includes an information generation module 201 and a recording module 202 as shown in FIG. 2.

When obtaining the steering instruction information via the communication unit 118, the information generation module 201 (a generation means) generates the steering-instruction related information corresponding to the steering instruction information and transmits the steering-instruction related information to the recording module 202.

Whenever the recording module 202 (a recording means) obtains the image data captured by the image capturing apparatus 130 from the image capturing apparatus 130 via the bus, the recording module 202 associates the obtained image data with the steering-instruction related information transmitted from the information generation module 201. Thereafter, the recording module 202 transmits the image data and the steering-instruction related information, which are associated with each other, to the RAM 113, and records and holds them.

Here, input data from the image capturing apparatus 130 to the information generation module 201 is the image data captured by the image capturing device 132, but is not limited thereto as long as the input data is captured data generated by the image capturing apparatus 130. For example, the captured data input from the image capturing apparatus 130 to the information generation module 201 may be sound data obtained by a sound obtaining device (not shown) of the image capturing apparatus 130 instead of the image data. This enables to easily obtain material data used in a case where image data and sound data are separately captured and then are combined later to make a VLOG.

For example, sound material data that emphasizes volume in accordance with steering can be obtained by recording engine sound obtained by the sound obtaining device in association with a treading degree of the accelerator (the steering instruction information) at the time of the obtaining. The captured data input from the image capturing apparatus 130 to the information generation module 201 may be data including image data and sound data. Thus, the image recording unit 135 can record the steering-instruction related information generated for the sound in association with the image data.

Figure 3:
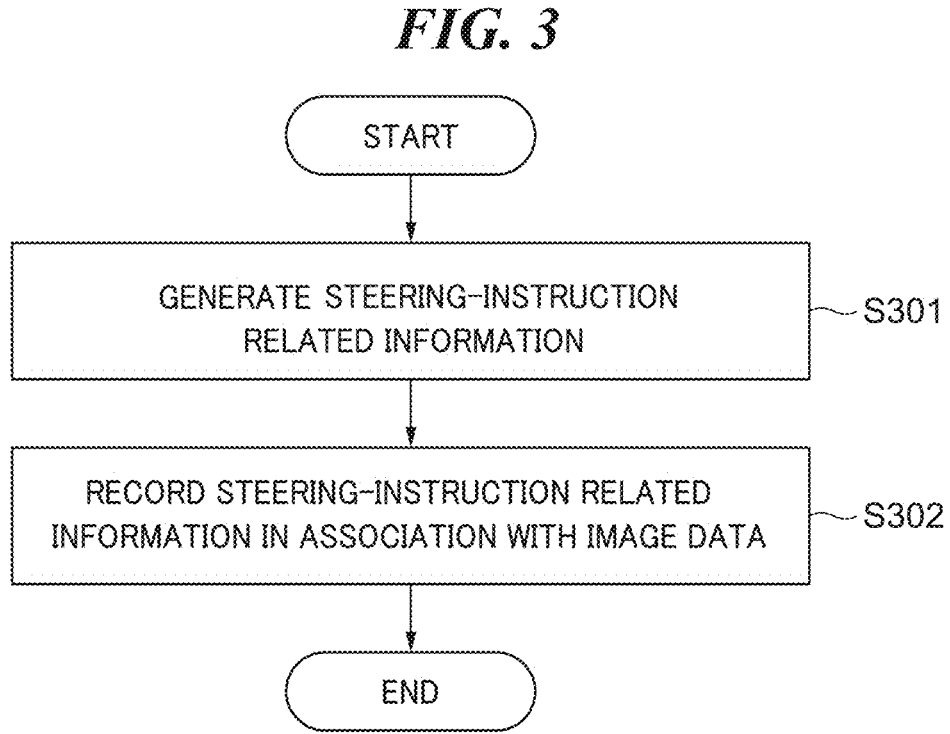
FIG. 3 is a flowchart showing a recording operation process performed by the image recording unit.

Next, the recording operation process executed by the image recording unit 135 will be described using a flowchart in FIG. 3. This process is executed whenever the communication unit 118 obtains the steering instruction information from the mobile object 150.

In a step S301, when the steering instruction information is input from the communication unit 118, the information generation module 201 generates the steering-instruction related information from the steering instruction information and outputs the steering-instruction related information to the recording module 202. Here, the steering instruction information is a flag indicating a steering instruction content, such as treading of the accelerator, turning of the steering wheel, or opening of the window, and is expressed by a number indicating the steering instruction information set in advance as shown in FIG. 4A.

Further, the steering instruction information may be a flag expressed by a multi-value that is distinguished according to the treading degree of the accelerator, for example, as shown in FIG. 4B. In addition, although the steering-instruction related information is generated from the steering instruction information and is output in this embodiment, the steering instruction information itself may be output as the steering-instruction related information. A method of generating the steering-instruction related information from the steering instruction information will be described in detail later.

In a step S302, when the image data captured by the image capturing apparatus 130 is input, the recording module 202 records the input image data in association with the steering-instruction related information generated in the step S301. Then, this process is terminated.

The above is the process content of the image recording unit 135 according to this embodiment.

The method of generating the steering-instruction related information from the steering instruction information, as performed in the step S301, will now be described in detail.

In the step S301, the information generation module 201 generates an edit point flag associated in advance with the input steering instruction information as the steering-instruction related information. The editing point flag indicates an edit point (an in-point or an out-point) for an image, an edit point (an in-point or an out-point) for sound. For example, when the steering instruction information (the flag 1-1 in FIG. 4A) indicating the steering instruction content of the treading of the accelerator is input, the edit point flag 2-3 indicating the in-point for the corresponding sound is generated as the steering-instruction related information in accordance with the table shown in FIG. 5. Thereafter, the edit point flag 2-3 generated as the steering-instruction related information is recorded in association with the image data in the step S302. Thus, the user can grasp the image data that is a candidate of the timing for adding the sound data of the engine sound when editing the image of the mobile object 150 during acceleration by treading the accelerator.

Although the case where the edit point flag associated with the input steering instruction information in advance exists as the steering-instruction related information has been described in this embodiment, the edit point flag may not exist. If the edit point flag does not exist, at least one of a flag 2-0 (a flag indicating that there is no corresponding steering-instruction related information) and the steering instruction information is output as the steering-instruction related information, or nothing is output.

In addition, in the step S301, the information generation module 201 may generate a transition edit point flag or a recommended transition flag associated with the input steering instruction information in advance as the steering-instruction related information. The transition edit point flag is a flag indicating an edit point (an in-point, an out-point, or the like) for image transition, a flag indicating an edit point (an in-point, an out-point, or the like) for sound transition as shown in the table in FIG. 6A. The recommended transition flag is a flag indicating recommended transition associated in advance with each steering instruction information as shown in the table in FIG. 6B.

A plurality of pieces of steering-instruction related information may be associated. For example, two pieces of steering instruction information (flag 1-2 in FIG. 4A) indicating the steering instruction content of turning the steering wheel may be input. In this case, a transition edit point flag (flag 3-1 in FIG. 6A) indicating an in-point for the image transition is generated as the steering-instruction related information for one of the two pieces of steering instruction information. In addition, a recommended transition flag (a flag 4-1 in FIG. 6B) indicating a rotation transition is generated as the steering-instruction related information for the other.

After that, the flags 3-1 and 4-1 generated as the steering-instruction related information are recorded in association with the image data in the step S302. Thus, even if all images are not checked in editing the images capturing the mobile object 150 in turning by turning the steering wheel, the user can grasp the image data that is a candidate of the timing to insert the rotation transition for rotating the image by the image process.

Although the cases where the transition edit point flag and the recommended transition flag associated with the input steering instruction information in advance exist as the steering-instruction related information have been described in this embodiment, the transition edit point flag and the recommended transition flag may not exist. If these pieces of information do not exist, at least one of a flag 4-0 (a flag indicating that there is no corresponding steering-instruction related information) and the steering instruction information is output as the steering-instruction related information, or nothing is output.

In addition, in the step S301, the information generation module 201 may generate, as the steering-instruction related information, an already-captured transition flag associated in advance with the steering instruction information and the camera work information obtained by the image recording unit 135.

Here, the camera work information is a flag indicating a content of location-and-orientation control (a camera work) of the moving apparatus 110 by the controller 111 during the image capturing by the image capturing apparatus 130, and is expressed by a number indicating the content of the camera work set in advance as shown in FIG. 7.

The already-captured transition flag here refers to a flag indicating a combination of the steering instruction content and the type of the camera work. For example, as shown in the table in FIG. 7, there is a case where a flag 1-4 indicating the steering instruction content of turning the steering wheel is input and a flag 5-1 indicating the camera work content of image rotation is input at the same time. In this case, a flag 6-1 that is the already-captured transition flag indicating that the image is captured while rotating when the steering wheel is turned, corresponding to the combination of the flags 1-4 and 5-1 is generated as the steering-instruction related information. Thereafter, the flag 6-1 generated as the steering-instruction related information is recorded in association with the image data in the step S302. This allows the user to grasp that the transition has been captured at the time of image capturing without checking all the images.

Although the case where the already-captured transition flag associated in advance with the input steering instruction information and the input camera work information exists as the steering-instruction related information has been described in this embodiment, the already-captured transition flag may not exist. If these pieces of information do not exist, at least one of a flag 6-0 (a flag indicating that there is no corresponding steering-instruction related information), the steering instruction information, and the camera work information is output as the steering-instruction related information, or nothing is output. When the input steering instruction information and the input camera work information are not associated in advance with each other, at least one of the flag 6-0 and the steering instruction information is output as the steering-instruction related information, or nothing is output.

In addition, in the step S301, the information generation module 201 may perform weighting on the input steering instruction information and generate a weighting result as the steering-instruction related information. For example, as shown in a table in FIG. 8, when the steering instruction information indicating the treading degree of the accelerator is input, flags 7-20, 7-40, and 7-60 indicating the weighting results are generated as the steering-instruction related information. Thereafter, the flags 7-20, 7-40, and 7-60 generated as the steering-instruction related information are recorded in association with the corresponding image data in the step S302. Thus, when the image is edited, the volume of the engine sound to be added can be changed according to the treading degree of the accelerator.

In addition, in the step S301, the information generation module 201 may generate an edit point flag associated in advance with a combination of the steering instruction information and surrounding space information obtained by the image recording unit 135 as the steering-instruction related information. The surrounding space information here is not particularly limited as long as it is information relating to the surrounding space of the mobile object 150 (car body) with steering. For example, the information includes steering-instruction related information for a different mobile object (another car body) with steering in the surrounding space, information indicating surrounding environment of the mobile object 150 such as a tunnel or a downtown, and information indicating weather around the mobile object 150 such as rain or snow.

The surrounding space information is obtained by a surrounding space information obtaining device (not shown) and is received by the information generation module 201 via the communication unit 118. For example, when another car is reflected into the captured image due to a lane change, the flag 1-1 may be obtained from the mobile object 150 and the information generation module 201 may obtain the steering instruction information (a flag 8-1) indicating a blinking instruction of the blinker of the other car as shown in a table in FIG. 9. In this case, an edit point flag 9-1 corresponding to the combination of the flags 1-1 and 8-1 is generated as the steering-instruction related information, and is recorded in association with the image data in the step S302. This makes it easy for the user to find a scene in which another car body may be reflected into the image in editing the captured image.

Although the case where the editing point flag associated in advance with the input steering instruction information and the input surrounding space information exists as the steering-instruction related information has been described in this embodiment, the editing point flag may not exist. If these pieces of information do not exist, at least one of a flag 9-0 (a flag indicating that there is no corresponding steering-instruction related information), the steering instruction information, and the surrounding space information is output as the steering-instruction related information, or nothing is output. When the input steering instruction information and the input surrounding space information are not associated in advance with each other, at least one of the flag 9-0 and the steering instruction information is output as the steering-instruction related information, or nothing is output.

In the step S301, when a plurality of pieces of steering instruction information indicating the same steering instruction content are obtained during the image capturing by the

| image capturing device 132, the information generation module 201 may change the plurality of pieces of the same steering instruction information obtained to a combination of associated sets.

For example, when two different images are captured when the steering instruction of turning the steering wheel is issued in the mobile object 150, the information generation module 201 obtains two pieces of the same steering instruction information (flags 1-4). In this case, one of the two pieces of the same steering instruction information (the flags 1-4) is changed to a flag 1-4-1, and the other is changed to a flag 1-4-2, and these are set as a combination of sets. For the flag 1-4-1, a flag indicating an out-point for image transition, which is an edit point flag associated in advance, is generated as the steering-instruction related information. For the flag 1-4-2, a flag indicating an in-point for the image transition, which is an edit point flag associated in advance, is generated as the steering-instruction related information.

Thereafter, the flags generated as the steering-instruction related information are recorded in association with the corresponding image data in the step S302. This makes it easy for the user to find a timing of transition and a candidate of an image to be connected by the transition in editing the image.

In addition, when three or more different images are captured when the steering instruction of turning the steering wheel is issued in the mobile object 150, the information generation module 201 obtains three or more pieces of the same steering instruction information (flags 1-4). In this case, the flag that the information generation module 201 has obtained first among the three or more pieces of the same steering instruction information (flags 1-4) is set as a flag 1-4-11 (first steering instruction information). On the other hand, the remaining flags are changed to a flag 1-4-12 (second steering instruction information), a flag 1-4-13 (third steering instruction information), . . . in the order of the flags obtained by the information generation module 201. Thus, the flags 1-4-11, 1-4-12, and 1-4-13 are set to a combination of sets.

For the flag 1-4-11, a flag indicating an out-point for image transition, which is an edit point flag associated in advance, is generated as the steering-instruction related information. Also, for the flags 1-4-12, 1-4-13, . . . , flags indicating in-points for image transition, which are edit point flags associated in advance, are generated as the steering-instruction related information. Thereafter, each flag generated as the steering-instruction related information is recorded in association with the corresponding image data in the step S302. This makes it easy for the user to find a candidate of an image to be connected by transition in editing the image.

In this embodiment, the case where when the information generation module 201 obtains a plurality of pieces of steering instruction information indicating the same steering instruction content, the plurality of pieces of the same steering instruction information are changed to the combination of sets has been described, but this is not limiting. For example, when there is no steering instruction information to be changed to a combination of sets, the corresponding steering-instruction related information is output without changing the steering instruction information.

The above is the contents of the process of generating the steering-instruction related information. With the above configuration, the user can easily edit the image according to the steering-instruction related information while referring to the image data.

In this embodiment, the case where the image recording unit 135 as the information processing apparatus is inside the mobile image capturing apparatus 100 has been described, but the image recording unit 135 may be inside a server (not shown) that can communicate with the mobile image capturing apparatus 100 and the mobile object 150. When the image recording unit 135 is inside the server, the steering instruction information from the mobile object 150, the image data information captured by the image capturing apparatus 130, the camera work information by the controller 111, and the like are transmitted to the image recording unit 135 inside the server.

Also in this embodiment, the image recording unit 135 as the information processing apparatus may be inside the mobile object 150. In this case, the image data captured by the image capturing apparatus 130, the camera work information by the controller 111, and the like are transmitted to the mobile object 150.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-200675, filed Nov. 28, 2023, which is hereby incorporated by reference herein in its entirety.

What is claimed is:

1. An information processing apparatus comprising:
a memory device that stores a set of instructions; and
at least one processor that executes the set of instructions to:
obtain steering instruction information about a mobile object with steering;

generate steering-instruction related information corresponding to the steering instruction information;

obtain captured data generated by an image capturing apparatus, which is mounted on a mobile image capturing apparatus, capturing an image of the mobile object; and record the captured data and the steering-instruction related information generated in association with each other whenever the captured data is obtained from the image capturing apparatus, wherein the steering-instruction related information includes an edit point flag indicating either one of an edit point for an image and an edit point for sound.

2. The information processing apparatus according to claim 1, wherein the steering-instruction related information includes the steering instruction information.

3. The information processing apparatus according to claim 1, wherein the steering-instruction related information includes a transition edit point flag indicating either one of an edit point for image transition and an edit point for sound transition.

4. The information processing apparatus according to claim 1, wherein the steering-instruction related information includes a recommended transition flag indicating either one of recommended transition for image transition and recommended transition for sound transition.

5. The information processing apparatus according to claim 1, wherein the steering instruction information is a flag expressed by a multi-value.

6. The information processing apparatus according to claim 1, wherein the steering-instruction related information includes a flag corresponding to a combination of the steering instruction information and information about a camera work in the mobile image capturing apparatus.

7. The information processing apparatus according to claim 1, wherein the steering-instruction related includes a flag corresponding to a combination of the steering instruction information and surrounding space information about a surrounding space of the mobile object.

8. The information processing apparatus according to claim 7, wherein the surrounding space information about the surrounding space of the mobile object is the steering instruction information of another object different from the mobile object.

9. The information processing apparatus according to claim 7, wherein the surrounding space information about the surrounding space of the mobile object is information indicating surrounding environment of the mobile object.

10. The information processing apparatus according to claim 7, wherein the surrounding space information about the surrounding space of the mobile object is information indicating weather surrounding the mobile object.

11. The information processing apparatus according to claim 1, wherein the image capturing apparatus includes an image capturing device and a sound obtaining device, and wherein the captured data is at least one of image data captured by the image capturing device or sound data obtained by the sound obtaining device.

12. The information processing apparatus according to claim 1, wherein the at least one processor executes the set of instructions to change a plurality of same steering instruction information pieces obtained as the steering instruction information to combination of different steering instruction information pieces.

13. The information processing apparatus according to claim 12, wherein the at least one processor executes the set of instructions to:

change one of two same steering instruction information pieces to a steering instruction information piece associated with the steering-instruction related information indicating an in-point of an edit point; and change another of the two pieces of the same steering instruction information obtained to steering instruction information associated with the steering-instruction related information indicating an out-point of the edit point.

14. The information processing apparatus according to claim 12, wherein the at least one processor that executes the set of instructions to:

change an earliest obtained steering instruction information piece among three same steering instruction information pieces obtained as the steering instruction information to first steering instruction information piece associated with the steering-instruction related information indicating an in-point of an edit point; and change remaining two same steering instruction information pieces to second steering instruction information piece and third steering instruction information associated with the steering-instruction related information piece indicating out-points of the edit point in an order of obtained.

15. The information processing apparatus according to claim 1 that is inside the mobile image capturing apparatus.

16. The information processing apparatus according to claim 1 that is inside the mobile object.

17. The information processing apparatus according to claim 1 that is inside a server that is communicably connected to the mobile image capturing apparatus and the mobile object.

18. A control method for an information processing apparatus, the control method comprising:

obtaining steering instruction information about a mobile object with steering;

generating steering-instruction related information corresponding to the steering instruction information;

obtaining captured data generated by an image capturing apparatus, which is mounted on a mobile image capturing apparatus, capturing an image of the mobile object; and recording the captured data and the steering-instruction related information generated in association with each other whenever the captured data is obtained from the image capturing apparatus, wherein the steering-instruction related information includes an edit point flag indicating either one of an edit point for an image and an edit point for sound.

19. A non-transitory computer-readable storage medium storing a control program causing a computer to execute a control method for an information processing apparatus, the control method comprising:

obtaining steering instruction information about a mobile object with steering;

generating steering-instruction related information corresponding to the steering instruction information;

obtaining captured data generated by an image capturing apparatus, which is mounted on a mobile image capturing apparatus, capturing an image of the mobile object; and recording the captured data and the steering-instruction related information generated in association with each other whenever the captured data is obtained from the image capturing apparatus, wherein the steering-instruction related information includes an edit point flag indicating either one of an edit point for an image and an edit point for sound.

\* \* \* \* \*